United States Patent [19]

Simard

[11] Patent Number: 4,624,031

[45] Date of Patent: Nov. 25, 1986

[54] DESCALER ROLL FOR FISH SCALING MACHINE

[75] Inventor: Albert Simard, Windsor, Canada

[73] Assignee: Simnar, Inc., Windsor, Canada

[21] Appl. No.: 800,699

[22] Filed: Nov. 22, 1985

[51] Int. Cl.$^4$ ............................................. A22C 25/02
[52] U.S. Cl. ............................................................. 17/64
[58] Field of Search .............................. 17/21, 26, 62, 64

[56] References Cited

U.S. PATENT DOCUMENTS 3,787,927  1/1974  Simard ................................. 17/64
4,459,721  7/1984  Hill ..................................... 17/21 X

FOREIGN PATENT DOCUMENTS 2747253  6/1978  Fed. Rep. of Germany .......... 17/62

*Primary Examiner*—Willie G. Abercrombie
*Attorney, Agent, or Firm*—Cullen, Sloman, Cantor, Grauer, Scott & Rutherford

[57] ABSTRACT

In a fish scaling machine having a framework, a power source, a conveyor supporting one side of a fish and a hold down assembly yieldably engaging the other side of the fish, a descaler roll mounted on a drive shaft journaled upon the framework and connected to the power source. A pair of aligned engaging cylindrical roller bodies having right angular end faces are mounted end to end upon the drive shaft and secured thereto. Generally parallel helical teeth upon, around and projecting from each roller body, the teeth on said bodies being inclined rearwardly toward each other at an acute angle to the drive shaft. Teeth at their one ends extending to an end face of each roll body and with their other ends having axial projections extending outward of their other end faces, the teeth extensions of one roller body overlying the other roller body, extending between and interlocked with the adjacent teeth of the other roll body at their engaging end faces.

7 Claims, 7 Drawing Figures

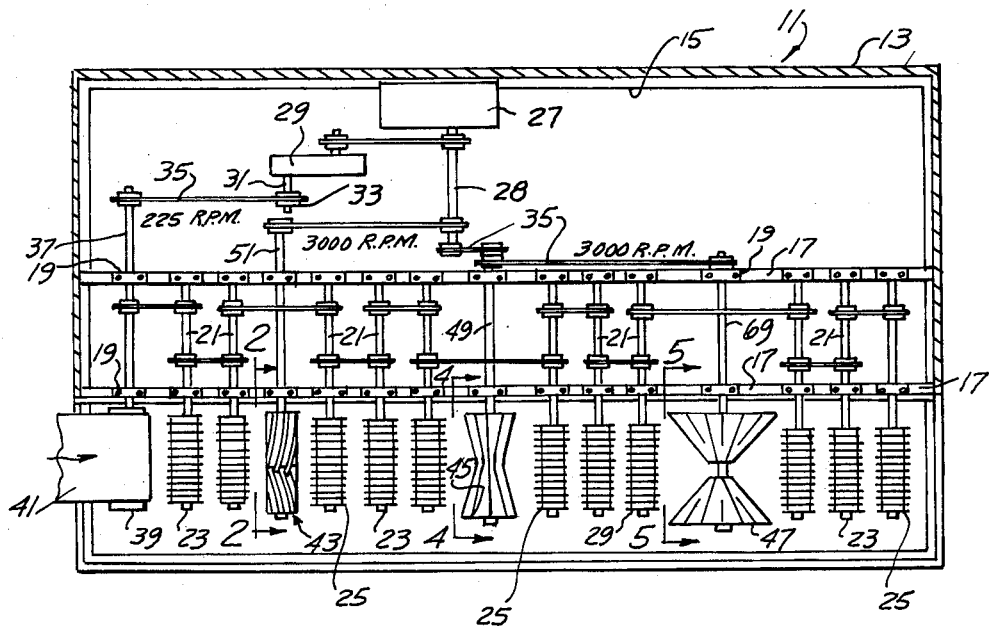
FIG. 1
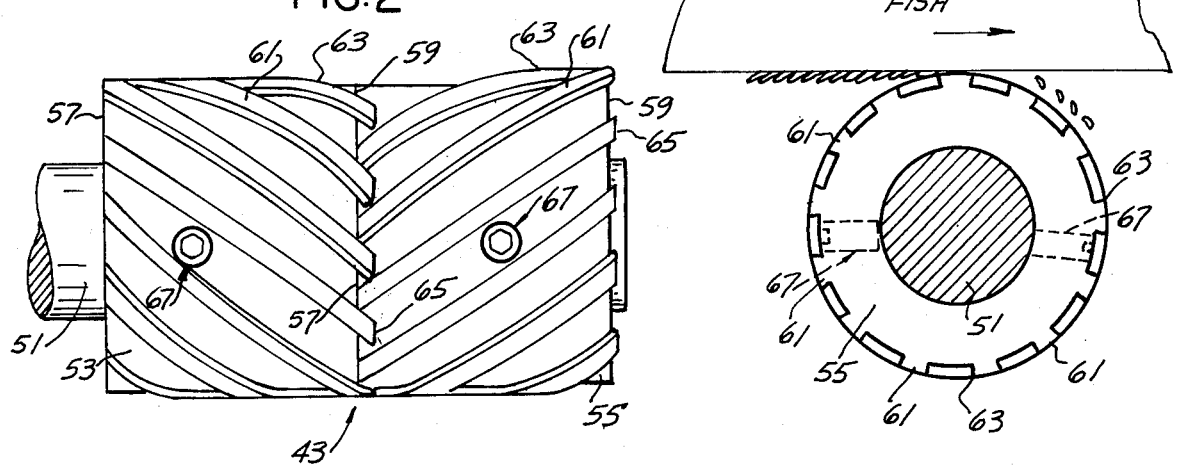
FIG. 2
FIG. 3

U.S. Patent  Nov. 25, 1986  Sheet 2 of 2  4,624,031
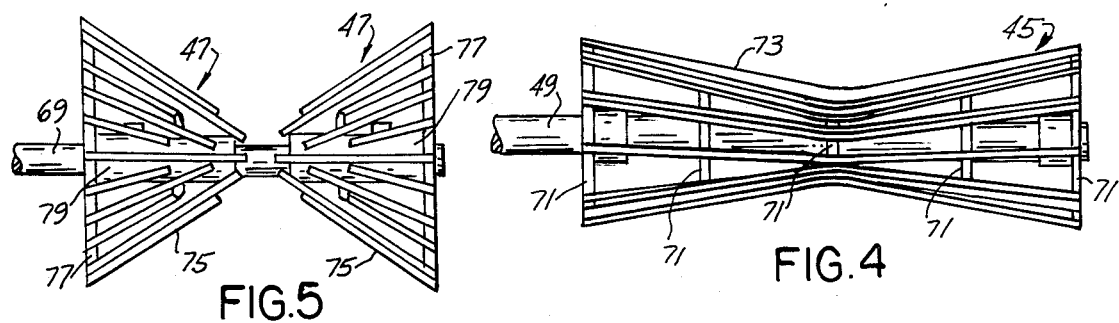
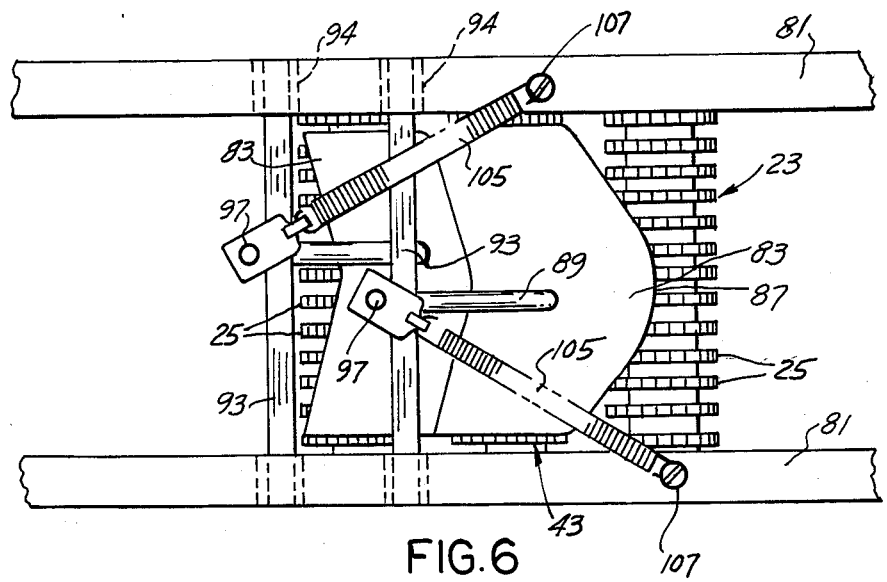
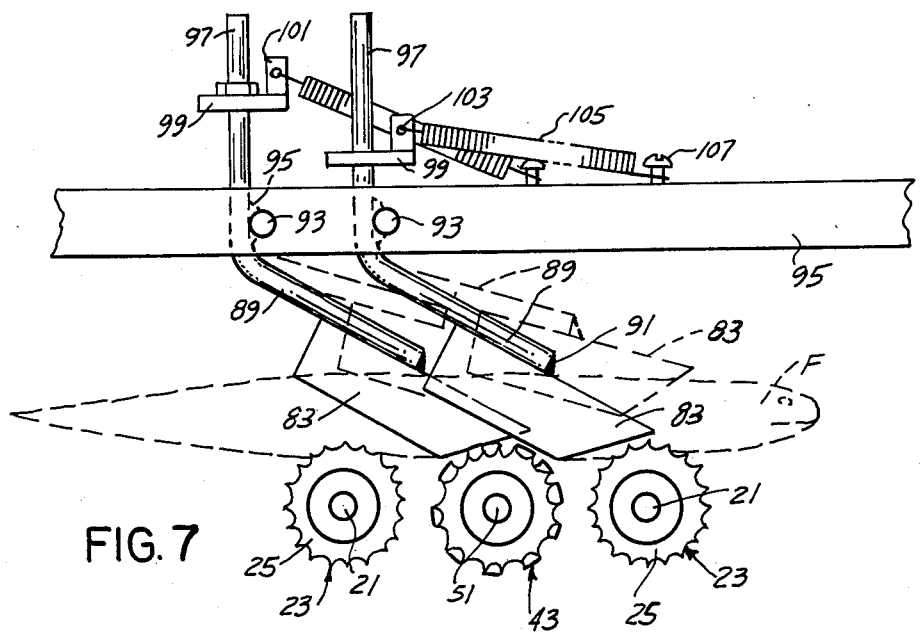

DESCALER ROLL FOR FISH SCALING MACHINE

FIELD OF INVENTION

The present invention is directed to an improved descaler roll adapted for use in conjunction with commercial type of fish scaling machines such as shown in my U.S. Pat. No. 3,787,927.

BACKGROUND OF THE INVENTION

In the first of a series of transversely arranged power rotated descaler rollers of my U.S. Pat. No. 3,787,927 and particularly the descaler roll 51 shown in FIG. 4, there were included a series of elongated downwardly depressed curved blades 55 which were affixed as by welding to the end support disks 53 which are secured to a drive shaft 61 journaled on the fish scaling machine. The descaler roll was designed to remove the scales from the side of a fish as the fish passes thereover movably supported upon a conveyor assembly.

Such descaler roll with its series of elongated curved blades had completely open spaces between the blades. These open spaces caused damage to the fish eyes and to the fins on the sides of the fish as the fish passed over the blades. The open spaces further accumulated the loosened scales and eventually clogged up the descaler roll. In the use of a fish scaling machine as shown in U.S. Pat. No. 3,787,927, the fish descaler roll 51 was functionally sufficient in those cases where the customers purchase the fish parts with the heads removed.

In those situations where desirable to ship the descaled fish with the heads complete and undamaged, a different type of descaler roll is required.

THE PRIOR ART

The most pertinent prior art is Applicant's U.S. Pat. No. 3,787,927 dated Jan. 29, 1974 entitled: Fish Scaling Machine, and Applicant's earlier issued U.S. Pat. No. 3,088,164 of May, 1963 for a fish scaling machine.

SUMMARY OF THE INVENTION

An important feature of the present invention is to provide an improved fish descaler roll particularly useful for descaled fish wherein the heads remain intact.

Another feature is to provide an improved descaler roller adapted for use in the fish scaling machine such as shown in U.S. Pat. No. 3,787,927 and wherein the open type descaler roll disclosed therein is replaced by the present improved descaler roll consisting of a pair of solid rollers. Each of the rollers has a series of teeth machined in a helical direction. The teeth at one end of the rollers extend axially beyond the one end faces of the rollers.

As another feature each roller body includes helical teeth which at their other ends extend to the corresponding right angular end face thereof.

As another feature a pair of engaging cylindrical roller bodies are arranged upon a power driven shaft end to end and each helical teeth projection at one end of one roller body overlies the other roller body, projects into, and extends between and is interlocked with the adjacent helical teeth of the other roller body at their adjacent engaging end faces.

An important feature is to provide a pair of descaler roll bodies of cylindrical shape with elongated helical teeth thereon with the bodies arranged end to end upon and secured to a power driven shaft and wherein there is an overlap between the extended helical teeth of one roller body over and onto the surface of the adjacent roller body and an interlock between the adjacent helical teeth. This provides a solid surface thereby eliminating damage to the fish eyes and fins on the side of the fish as the fish passes over the descaler roll at the same time effectively removing the scales on one side of the fish.

A further feature includes the helix of the machined teeth having more of an angle than the helix of the curved blades in the descaler roll 51 of U.S. Pat. No. 3,787,927. The increase in the angle of the helix combined with solid rollers without open spaces between the teeth prevents the loosened scales from building up and clogging the descaler roll as in the prior art above.

A further feature is to provide a descaler roll consisting of a pair of engaging cylindrical roller bodies having right angular end faces arranged end to end and secured upon a power driven drive shaft and wherein the present unique design for such rollers doubles the life expectancy of the roller assembly. This is accomplished by reversing the rollers end to end upon the supporting drive shaft thereby defining a new set of sharp edges provided by the corresponding leading edges of the helically shaped teeth which are generally rectangular or square in cross section.

A further feature is to provide an improved descaler roll consisting of a pair of cylindrical roller bodies with right angular end faces, mounted and secured end to end upon a power driven drive shaft, wherein the respective roller bodies have thereon generally parallel helical teeth which are inclined rearwardly towards each other at an acute angle with respect to the axis of the drive shaft.

These and other features and objects will be seen from the following specification and claims in conjunction with the appended drawings.

THE DRAWINGS

FIG. 1 is a fragmentary plan view of a fish scaling machine employing an improved descaler roll.

FIG. 2 is a side view of the present descaler roll taken in direction of arrows 2—2 of FIG. 1, on an increased scale.

FIG. 3 is an end view thereof with the drive shaft shown in section and with a portion of a fish schematically shown whose one side engages the descaler roll.

FIG. 4 is a fragmentary section on an increased scale taken in the direction of arrows 4—4 of FIG. 1.

FIG. 5 is a fragmentary view taken in direction of arrows 5—5 of FIG. 1, on an increased scale.

FIG. 6 is a fragmentary plan view of a hold down assembly for the fish as they are moved successively over the descaler roll of FIG. 1.

FIG. 7 is a fragmentary side elevational view thereof.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings, the present fish scaling machine generally indicated at 11 has a framework 13 with an underlying longitudinally disposed tank 15. The framework includes a pair of spaced longitudinally extending rails 17 and mounted thereon opposed pairs of journal blocks 19 adapted to receive and journal the respective drive shafts 21 for the conveyor rolls 23.

These conveyor rolls are longitudinally spaced along the length of the framework and rotate on axes extending at right angles to the path of feed movement of fish which move thereover in a continuous manner. Each of the feed rolls 23 includes a series of longitudinally spaces sharpened sprockets 25 affixed to the respective power rotated shafts 21, FIGS. 1, 6 and 7.

Motor 27, schematically shown in FIG. 1, is mounted upon framework 13 and is connected by a belt and pulleys to reducer 29 whose output shaft 31 drives pulley 33 which through a belt 35 and another pulley drives shaft 37, at 225 rpm, for illustration. Shaft 37 is mounted upon journal blocks 19 on rails 17. Mounted upon one end of shaft 37 is a feed roll 39 for the belt conveyor 41, fragmentarily shown. The fish are successively advanced in a line onto the conveyor assembly forming a part of the present fish scaling machine which includes a series of longitudinally spaced transverse feed rolls 23.

Power driven shaft 37 for roller 39 through the use of a series of additional pulleys and belts between the respective additional shafts 21 is adapted to affect simultaneous continuous power rotation of the respective feed rolls 23 forming a part of the fish conveyor.

It is regarded as equivalent to the pulleys and belts that there could be employed sprockets and chains for the conveyor assembly.

The roller 39 for the feed belt 41 moves in unison with each of the sprocket type feed rolls 23 for transporting fish throughout the length of the present fish scaling machine, FIG. 1. A series of longitudinally spaced differently shaped descaler rolls 43, 45 and 47 are interposed between the respective feed rolls 23 and are adapted to operatively engage different areas of one side of the fish as it moves over the conveyor rolls, FIGS. 3 and 7.

In the operation of the fish scaling machine in the U.S. Pat. No. 3,787,927, the corresponding descaler roll 51 damaged the eyes and the fins of fish passing thereover. Such roll being open was frequently clogged with scales. Accordingly for the purpose of the present invention and in situations for the use of the present fish scaling machine wherein the heads remain intact with the fish body the first descaler roll 43 replaces the descaler roll 51 shown in FIG. 4 of Applicant's earlier U.S. Pat. No. 3,787,927.

The first descaler roll 43 is shown on an enlarged scale in FIGS. 2 and 3 and includes a pair of aligned engaging cylindrically shaped roller bodies 53 and 55 having right angularly related end faces 57 and 59.

Each of the roller bodies 53 and 55 have thereon opposed rearwardly converging sets of helical teeth 61, which are rectangular or square in cross section. The teeth have defined therein the sharpened edges 63 adapted for operative engagement with the fish, as fragmentarily shown in FIG. 3. The respective sets of generally parallel helical teeth 61 upon the respective cylindrical bodies 53 and 55 and projecting therefrom are machined as an integral part of the respective cylindrical bodies.

For each of the respective bodies 53 and 55, the helical teeth at their one ends extend to the corresponding end face 57. The helical teeth on said helical bodies at their other ends have teeth extensions 65 of the same cross sectional shape which project axially outward of the corresponding end face 59. These extensions 65 overlie the corresponding adjacent body 55, extend between the respective teeth 61 upon body 55 and are interlocked therewith.

The respective cylindrical bodies 53 and 55 when assembled, FIG. 2, upon drive shaft 51 are secured thereto by the radial set screws 67, FIGS. 2 and 3. As distinguished from the blades 55 FIG. 4 in reference U.S. Pat. No. 3,787,927 which provided an open descaler roll 51 there is thus provided for the present descaler roll 43 a pair of solid roller bodies. Each of these roller bodies include a series of teeth 61 machined in a helical direction with the teeth extending approximately 1/16 of an inch past the end face 59 at one end of the roller body.

The respective roller bodies 53, 55 which constitute the present descaler roll 43 are interlocked, FIG. 2, and secured upon the stainless steel drive shaft 51 forming a part of the fish scaling machine shown in FIG. 1.

With the roller bodies 53 and 55 positioned end to end on shaft 51 and with the elongated teeth 61 of one roller body interlocking with the teeth 61 of the other roller body there becomes a solid surface in the center of the descaler roll 43.

This solid surface eliminates the damage caused by the descaler roll 51 of U.S. Pat. No. 3,787,927, to the eyes and to the fins on the side of the fish as it passes over the descaler roll, while effectively removing all of the adjacent scales on said one side of the fish.

The helix of the machined teeth 61 of the present descaler roll 43 has more of an angle than the helix of the curved blades 55 in U.S. Pat. No. 3,787,927. The increase in the angle of the helix combined with the solid roller bodies 53, 55 without open spaces prevents the loosened scales from building up and clogging the descaler roll as was the case in the prior art.

In assembly of the present descaler roll 43, roller body 53 is positioned upon stainless steel drive shaft 51 of the fish scaling machine with the extending teeth elements 65 pointed axially outwardly of body 53 then secured to shaft 51 by set screws 67, FIGS. 2 and 3.

The second roller body 55 is then positioned on the same shaft so that the end face 57 of roller body 55 without the extended teeth is positioned snugly against the end face 59 of roller body 53. The extended teeth on roller body 53 interlock with the teeth of the second body 55. Thereafter the second roller body is secured upon drive shaft 51 by set screws 67 or other fastener. It is contemplated that the mounting of the respective roller bodies 53 and 55 could include a suitable key interposed between respective bodies and drive shaft 51.

The present descaler roll 43, because of its unique design with the corresponding roller bodies 53 and 55, has an increased life expectancy.

This is achieved by reversing the roller bodies 53 and 55 upon the drive shaft 51. Roller body 53 is positioned first on drive shaft 51 with elongated teeth 61 extending axially inward. Then the roller body 55 is positioned on shaft 51 with the elongated teeth 61 facing roller 53 so that they interlock with teeth 61 on end face 57 of roller body 53, and are thus secured end to end. Simply by reversing the first roller body 53 and roller body 55, the descaler roll 43 has new sharp edges 63.

A similar construction of the elongated blades as rearwardly inclined is characteristic of all three of the descaler rolls 43, 45 and 47, FIGS. 1, 2, 4 and 5.

The present improved descaler roll 43 as affixed upon drive shaft 51 is parallel to the respective feed roll drive shafts 21 which through suitable pulleys and a belt 35 is connected to output shaft 28 of motor 27. Since it is directly connected to said motor, the descaler roll 43 may rotate at 3,000 rpm, for illustration.

Of importance in connection with descaler roll 43 is that the teeth 61 converge rearwardly and serve as a guide means to assure a path of rectilinear movement of the fish F as they move thereover upon their one sides upon conveyor rolls 23.

There is provided a centrally spaced additional descaler roll 45, FIGS. 1 and 4, wherein between the support plates or disks 71 mounted and secured upon drive shaft 49 are a series of more steeply and inwardly inclined blades 73. These are for operatively engaging side portions of fish F not engaged by the firt descaler roll 43.

The central depressed portion of descaler roll 45 also functions to centralize and guide the fish along a rectalinear path on conveyor assembly 23. The driven shaft 49 is mounted upon journal blocks 19 upon rails 17 and with suitable pulleys and belt 35 is connected to motor shaft 28 and is power rotated at 3,000 rpm in the illustrative embodiment.

The third descaler roll 47, FIGS. 1 and 5, includes power driven shaft 69 connected to motor drive shaft 28 and having secured thereon an opposed pair of blade elements 47. Each of the blade elements includes a support disk 77 mounting a suitable bushing 79. Steeply inclined blades 75 at their one ends are secured to the respective disks 77 as by welding and at their other ends are suitably secured as by welding to the bushings 79, FIG. 5.

The opposed pair of descaler rolls 47 with their blades at an increased and steeper angle than the angle of the blades 73 are adapted to operatively engage other side portions of the fish in order to remove the remainder of the scales as the fish F passes thereover.

Power driven shaft 69, FIGS. 1 and 5, extends through bushings 79, is affixed thereto and is parallel to the other shafts 49, 37 and 21. Shaft 69 through suitable pulleys and belt 35, FIG. 1, is conneced to motor output shaft 28 for power rotation at 3,000 rpm, for illustration.

HOLD DOWN AND GUIDE MECHANISM

Referring to FIGS. 6 and 7 as the fish F lying on one side is fed by the belt 41 onto the conveyor rolls 23, its undersurface is operatively engaged by the longitudinally spaced descaler rolls 43, 45 and 47 which due to their different shapes, and the inclination of respective cutting blades are adapted to remove the scales from one side of the fish.

During the scale removing operation there is provided a resilient yieldable hold down mechanism, FIGS. 6 and 7, which operatively and yieldably engages the opposite side of the fish as it moves successively along a rectilinear path over the conveyor rolls 23 throughout the length of scaling machine 11.

Forming a part of the fish scaling machine upon framework 13 is a pair of laterally spaced longitudinally extending rails 81 which are spaced above the feed rolls 23 and the descaler rolls 43, 45 an 47. Upon the rails 81 are mounted the present fan shaped longitudinally overlapping blades 83, FIGS. 6 and 7. These blades are adapted to operatively engage the opposite side of a fish during the descaling operation.

Spanning the rails 81 are a series of longitudinally spaced rock shafts 93 journaled within bushings 94 upon said rails. There are a plurality of fan shaped overlapping and longitudinally extending hold down blades 83, whose opposite sides 85 extend angularly outward, downwardly and whose forward end portions at 87 diverge rearwardly. These blades are of such shape as to operatively yieldably engage the opposite side of fish F from which the scales are being removed, FIG. 7.

Each of the fan shaped blades 83 is independently mounted for its own pivotal yielding movements with respect to the fish moving thereunder. The mounting of the respective blades 83 includes for each blade a support bar 89 which is inclined upwardly and rearwardly corresponding to the inclination of the respective blade 83, FIG. 7, and affixed thereto as at 91. As shown in FIG. 6, the bars 89 are laterally displaced with respect to the longitudinal axis of the respective blade 83 so as to provide suitable clearance for the succeeding and adjacent support bars of adjacent blades in the overlapping manner shown, FIGS. 6 and 7.

Each support bar 89 extends upwardly and rearwardly, past the corresponding rock shafts 93 and is secured thereto as by the weld 95. Bars 89 terminate in the upright extensions 97, FIG. 7. Brackets 99 are adjustably mounted upon the support bar extensions 97 and are suitably secured thereto. Each bracket includes an apertured ear 101 which receives as at 103 one end of elongated coil spring 105. Its opposite ends is anchored to one of the support rails 81 as at 107.

The respective successively aligned and overlapped fan shaped hold down blades 83 are at all times biased towards the descaling rolls 43, 45 and 47. Thus they are adapted to yieldably engage the opposite side of the fish as it moves over the respective descaler rolls on the feed conveyor 23 to assist descaling in a continuous manner. The succeeding fish are in alignment centrally of descaling rolls 43, 45 and 47 and conveyor assembly 23.

Having described my invention, reference should now be had to the following claims.

I claim:

1. In a fish scaling machine having a framework, a horizontally disposed conveyor adapted to supportably receive one side of a fish longitudinally movable thereover, a power drive, a series of longitudinally spaced first, second and third descaler rolls journaled upon the frame on axes at right angles to the direction of feeding, adapted to operatively engage said one side of said fish removing the scales therefrom as the fish are fed successively and continuously thereover, and a hold down and guide mechanism mounted upon the framework along said conveyor operatively and yieldably engaging the other side of the fish;

an improved first descaler roll comprising a drive shaft journaled upon said framework and connected to said power drive;

a pair of engaging cylindrical roller bodies with right angular end faces mounted end to end upon said drive shaft;

a radial set screw on each body in operative frictional and retaining engagement with said drive shaft;

generally parallel helical teeth on and around and projecting from each roller body;

the teeth of each body being inclined rearwardly toward each other and at an acute angle to said drive shaft;

said teeth at their one ends extending to one end face of each roller body, and at their other ends having axial projections outward of their other end faces;

the teeth extensions of one roller body overlying the other roller body, and extending between and interlocked with the adjacent teeth of the other roll at their engaging end faces.

2. In the fish scaling machine of claim 1, the teeth of each roller body being rectangular in cross section defining sharp leading edges for severing and removing adjacent scales of the fish as they pass thereover.

3. In the fish scaling machine of claim 1, said descaler roller bodies being reversable end to end upon said drive shaft with the teeth extensions of the other roller body overlying the one roller body, extending between and interlocked with the adjacent teeth of said one roller body at their opposing end faces, to double the life of said first descaler roll.

4. In a fish descaling machine having a framework, a conveyor to support one side of a fish, a power drive, a series of spaced first, second and third descaler rolls journaled upon said framework on axes at right angles to the direction of feeding, adapted to operatively engage said one side of said fish to removing scales therefrom, and a hold down guide means mounted upon the framework and spaced from said conveyor operatively engaging the other side of the fish;

an improved first descaler roll comprising a drive shaft journaled upon said framework and connected to said power drive;

a pair of engaging cylindrical roller bodies with right angular end faces mounted end to end upon said drive shaft;

a radial set screw on each body in operative frictional and retaining engagement with said drive shaft;

generally parallel helical teeth on and around and projecting from each roller body;

the teeth of each body being inclined rearwardly toward each other and at an acute angle to said drive shaft;

said teeth at their one ends extending to one end face of each roller body, and at their other ends having axial projections extending outward of their other end faces;

the teeth extensions of one roller body overlying the other roller body, extending between and interlocked with the adjacent teeth of the other roller body at their engaging end faces.

5. A rotatable fish descaler roll adapted for operative engagement with the scales upon one side of a fish transported along a framework including a power driven shaft journaled thereon comprising;

a pair of engaging cylindrical roller bodies with right angular end faces mounted end to end upon said shaft;

a radial set screw on each body in operative frictional engagement with said shaft;

generally parallel helical teeth on and around and projecting from each roller body;

the teeth of each body being inclined rearwardly toward each other and at an acute angle to said drive shaft;

said teeth at their one ends extending to one end face of each roll, and at their other ends having axial projections extending outward of their other end faces;

the teeth extensions of one roller body overlying the other roller body, extending between and interlocked with the adjacent teeth of the other roller body at their engaging end faces.

6. In the fish descaler roll of claim 5, the teeth of each roller body being rectangular in cross section defining sharp leading edges for severing and removing adjacent scales of the fish as they pass thereover.

7. In the fish descaler roll of claim 5, said descaler roll bodies being reversable end to end upon said drive shaft with the teeth extensions of the other roller body overlying the one roller body, extending between and interlocked with the adjacent teeth of said one roller body at their opposing end faces, to increase the life of said first descaler roll.

* * * * *